United States Patent [19]

Horiuchi

[11] Patent Number: 5,427,067

[45] Date of Patent: Jun. 27, 1995

[54] PISTON AND A CONNECTING ROD ASSEMBLY

[75] Inventor: Shigeaki Horiuchi, Fujisawa, Japan

[73] Assignee: Isuzu Motors, Ltd., Tokyo, Japan

[21] Appl. No.: 255,376

[22] Filed: Jun. 8, 1994

[30] Foreign Application Priority Data

| Jun. 8, 1993 | [JP] | Japan | 5-164279 |
| Jun. 23, 1993 | [JP] | Japan | 5-176002 |
| Jul. 31, 1993 | [JP] | Japan | 5-208357 |

[51] Int. Cl.$^6$ ............................................. F02B 75/32
[52] U.S. Cl. .................... 123/197.3; 123/41.37; 92/157; 29/888.04; 29/888.09
[58] Field of Search ............... 123/197.2, 41.35, 41.37, 123/41.38, 193.6, 197.3; 92/157, 187; 74/579 E; 29/888.04, 888.09; 403/125

[56] References Cited

U.S. PATENT DOCUMENTS

| 4,207,779 | 6/1980 | Papst | 123/197.3 |
| 5,115,725 | 5/1992 | Horiuchi | 92/157 |

Primary Examiner—Noah P. Kamen
Attorney, Agent, or Firm—John E. Toupal; Harold G. Jarcho

[57] ABSTRACT

An assembly including a piston having a crown surface, a bottom surface, and a skirt projecting therefrom and defining therewith a cavity; a cup-shaped housing retained in the cavity and having a bottom wall engaging the bottom surface and a side wall engaging the skirt; a collar retained within the housing and defining an annular concave surface facing the bottom surface; a connecting rod having a transversely projecting end portion defining an annular convex surface engaging the concave surface and an axially outwardly facing recess defining a slide surface; and a slide member retained in the recess and slidably engaged between the slide surface and the bottom wall.

17 Claims, 6 Drawing Sheets

PISTON AND A CONNECTING ROD ASSEMBLY

BACKGROUND OF THE INVENTION

The present invention relates generally to a piston and a connecting rod assembly for an internal combustion engine and, more particularly, to a piston and a connecting rod assembly which is readily assembled and provides improved oil lubrication and cooling.

An improved piston and connecting rod assembly is disclosed in U.S. Pat. No. 5,115,725. Contrary to conventional construction systems using a piston pin, the assembly disclosed in that patent provides a center of rod oscillation for a connecting rod with connecting rod considerably closer to the piston crown surface. Consequently, if lengths of an arm of a crank shaft and a connecting rod are lengthened by that amount, the cylinder displacement increases without changing dimensions and output of the engine is increased.

In the above mentioned piston and connecting rod assembly, a cavity formed by a piston skirt receives successively a slide member, a receiving end of a connecting rod, an annular collar for supporting the receiving end, an arresting sleeve for arresting the annular collar, and a retaining tube. Assembly problems can be caused by improper orientation of the individual pieces. In particular, since clearance between the retaining tube and the annular collar is small, an inadvertent inclination of the annular collar will prevent smooth rotation as the retaining tube is threadedly fitted into the piston skirt. Also, since a sliding portion of the receiving end is lubricated with oil previously supplied to a cooling oil chamber in the piston, the sliding portion can be insufficiently lubricated.

SUMMARY OF THE INVENTION

The invention encompasses an assembly including a piston having a crown surface, a bottom surface, and a skirt projecting therefrom and defining therewith a cavity; a cup-shaped housing retained in the cavity and having a bottom wall engaging the bottom surface and a side wall engaging the skirt; a collar retained within the housing and defining an annular concave surface facing the bottom surface; a connecting rod having a transversely projecting end portion defining an annular convex surface engaging the concave surface and an axially outwardly facing recess defining a slide surface; and a slide member retained in the recess and slidably engaged between the slide surface and the bottom wall. Fabrication of the assembly is simplified by first assembling the connecting rod, collar and slide member before insertion thereof into the cavity formed by the piston skirt.

According to one feature, the invention includes keying means for preventing relative rotational movement between the connecting rod and the piston along a longitudinal axis thereof and permitting relative translational movement between the piston and the end portion of the connecting rod in a direction transverse to the longitudinal. This feature reduces wear while simplifying assembly.

According to another feature of the invention, the cup-shaped housing establishes separate cooling and lubrication chambers that function, respectively, to cool the piston and lubricate interfaces between the collar and connecting rod end portion, the slide member and connecting rod end portion, and the slide member and cup-shaped housing. More efficient cooling and lubrication are provided by the distinct chambers.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
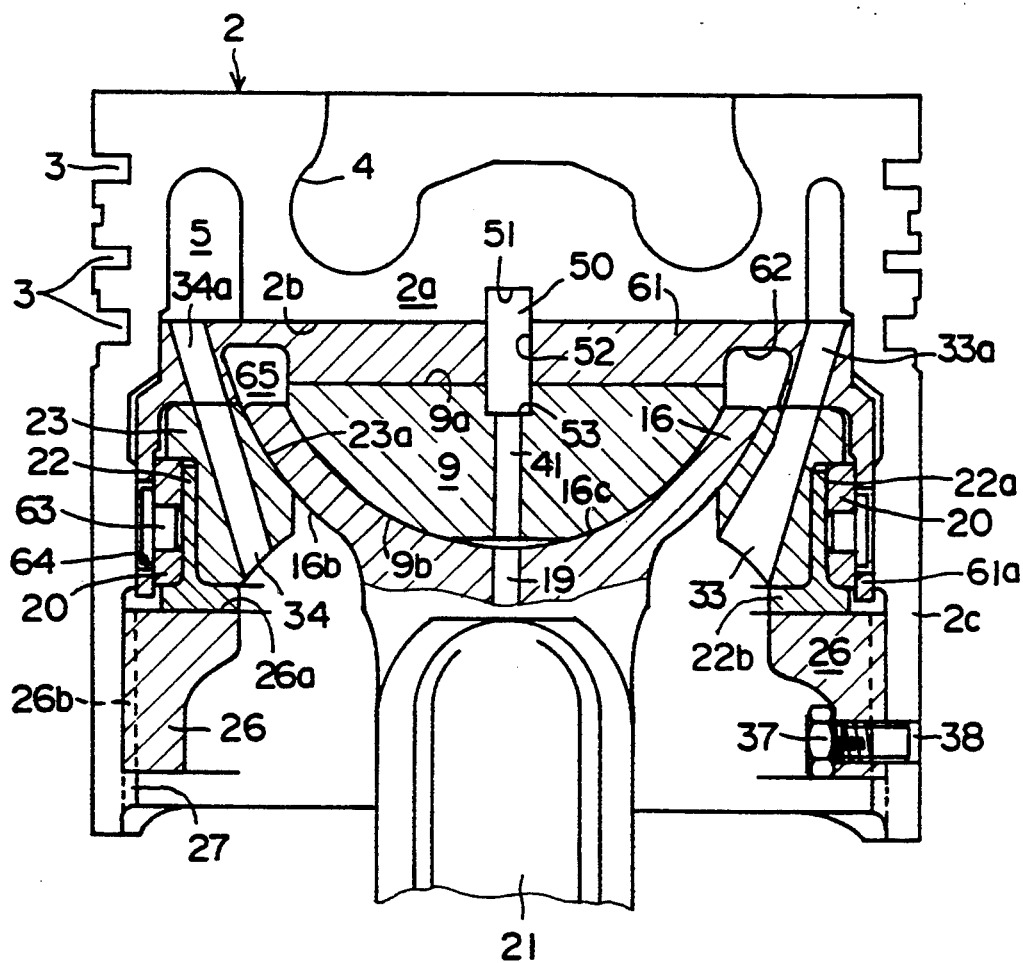
FIG. 1 is a front sectional view of a piston and connecting rod assembly according to the invention.

Illustrated in FIGS. 1–4 is a piston and connecting rod assembly according to the present invention. A piston 2 has a combustion chamber 4 formed by an asymmetrical depression in a crown surface of a crown portion 2a. A plurality of ring grooves 3 are provided in an upper outer half of the piston 2. Formed in a bottom surface 2b of the crown portion 2b is an annular cooling chamber 5 that surrounds the combustion chamber 4.

Figure 3:
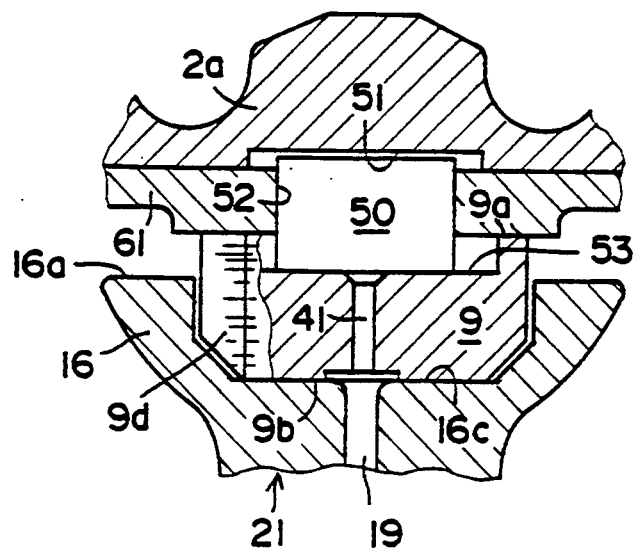
FIG. 3 is a side sectional view showing parts of the piston and a connecting rod assembly shown in FIG. 1.

A hemispherical transversely projecting end portion 16 of a connecting rod 21 is oscillatably held between a semicolumnar sliding member 9 and an annular collar 23 retained within an inverted cup-shaped housing 61. Provided in a bottom wall of the housing 61 is an annular groove 62 that partially receives a peripheral edge portion of the rod end portion 16 when it oscillates. As shown in FIG. 3, the semicylindrical slide member 9 has opposite ends 9d tapered, and a lower surface 9b engaged with a semicircular concave slide surface formed by the upper surface 16a of the rod end portion 16. The slide member 9 has a flat upper surface 9a which engages the bottom wall of the housing 61. Sliding movement of the slide member 9 in a lateral direction as viewed in FIG. 1 is precluded by a key block 50 but sliding movement thereof in a direction vertical to the paper surface and in direction of a crank shaft (not shown) is allowed. Therefore, the block 50 projects through a fitted square hole 52 in the bottom wall of the housing 61 and has ends slidably engaged, respectively, with a groove 51 extending vertically with respect to paper surface of FIG. 1 in the crown portion 2a and a groove 53 extending vertically with respect to paper surface of FIG. 1 in the upper surface 9a of the slide member 9.

Figure 4:
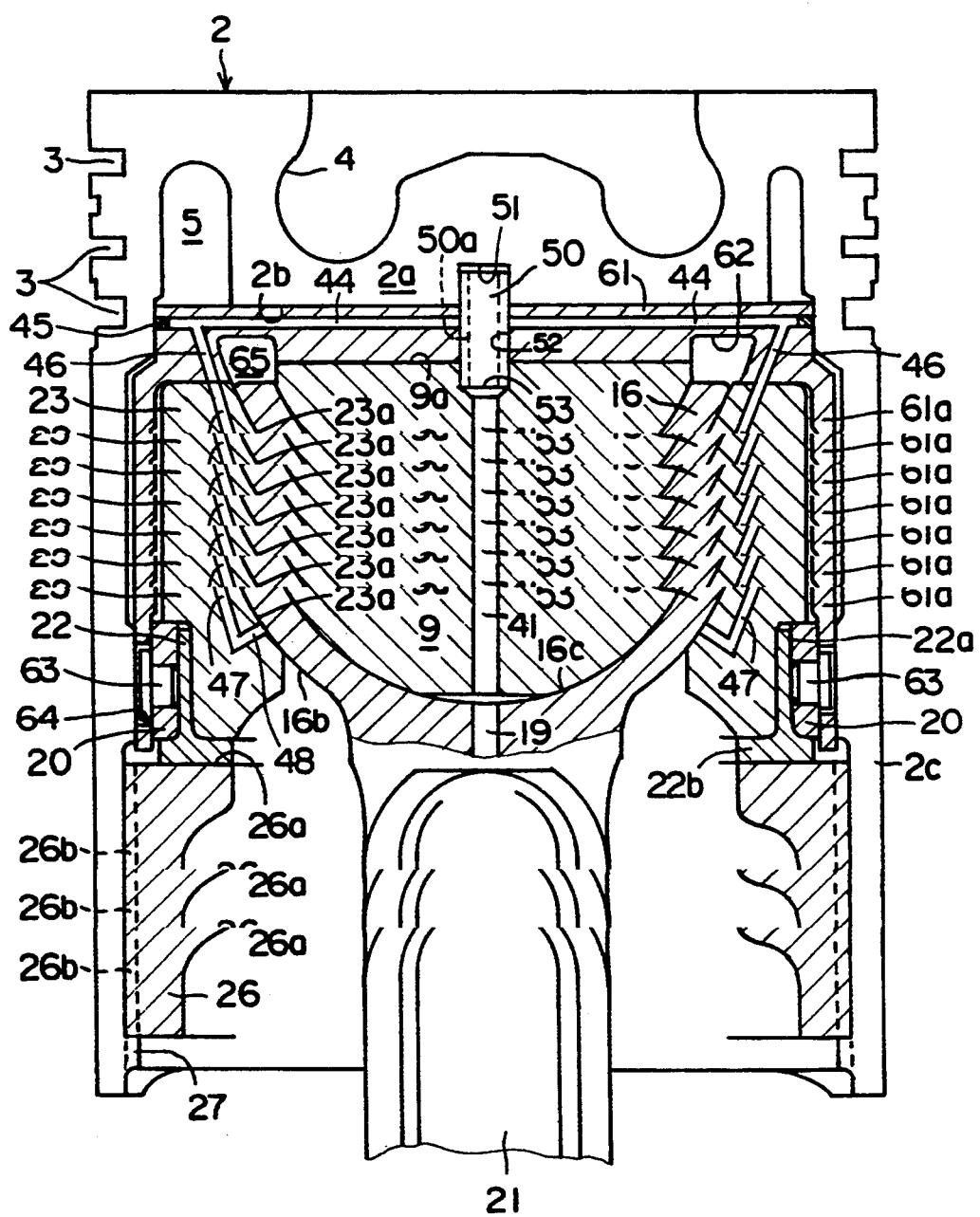
FIG. 4 is a sectional view showing lubricating oil passages for the piston and a connecting rod assembly shown in FIG. 1.

As shown in FIG. 4, the bottom wall of the housing 61 is interiorly formed with a plurality of oil passages 44 which extend diametrically outwardly from the square hole 52 and are the oil closed by plugs 45. The oil passages 44 communicate with collar 23 via downwardly extending oil passages 46, 47 and transverse passages 48 that open into an interface between an annular concave upper surface 23a of the annular collar 23, an annular convex surface 16b of the rod end portion 16. As shown in FIG. 1, the spherically convex surface 16b is engaged in a slidably contact manner with the spherically concave surface 23a. To facilitate assembly, the annular collar 23 is formed by two circumferentially divided parts which are fitted into an arresting sleeve 22. A flange 22b at the lower end of the arresting sleeve 22 is supported on an upper end surface 26a of a retaining tube 26.

Figure 2:
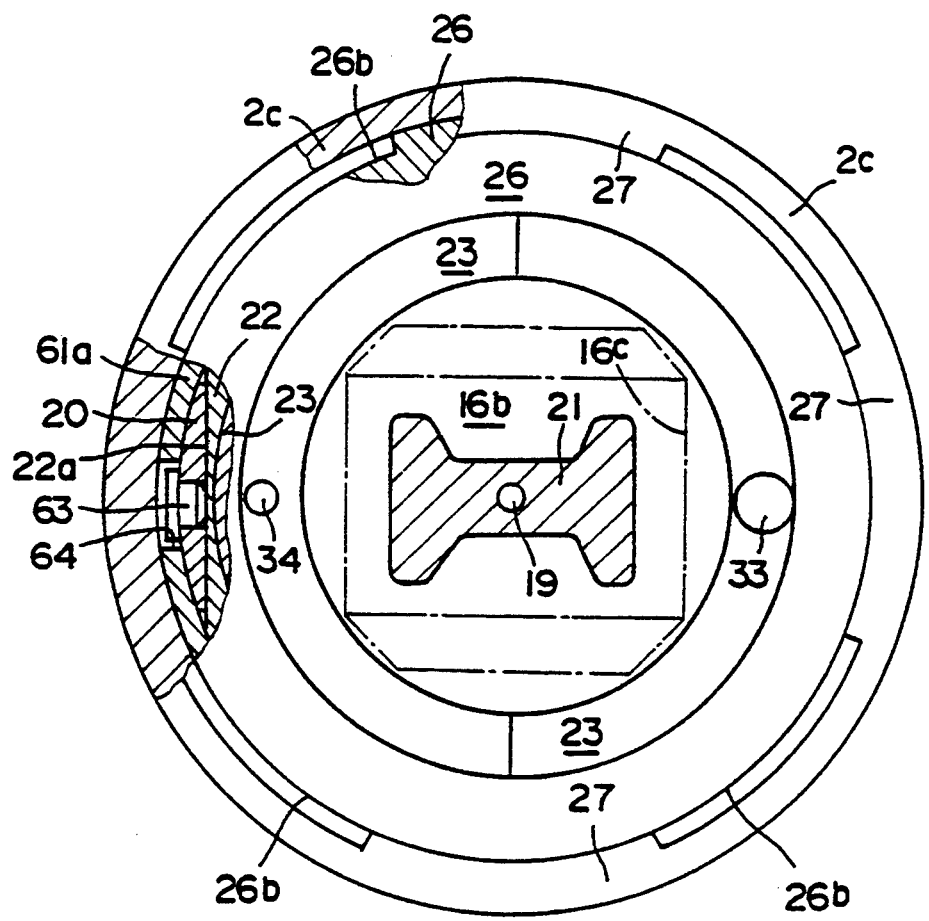
FIG. 2 is a bottom view of the piston and a connecting rod assembly shown in FIG. 1.

As shown in FIG. 2, the arresting sleeve 22 has diametrically opposed outer peripheral flat surfaces 22a oriented parallel to a crank (not shown) and fitted into a side wall portion 61a of the housing 61. A pad member 20 having a cresent-shape in horizontal section is sandwiched between each of the flat surfaces 22a and the peripheral side wall portion 61a of the housing 61. Press fitted into each of the pads 20 is an inner end of a diametrical pin 63, an outer end of which is inserted into a pin hole 64 in the peripheral end wall 61a of the housing 61. The arresting sleeve 22 is prevented from rotating with respect to the housing 61 by the key pads 20. The housing 61 is prevented from rotating with respect to the piston 2 by the key block 50 and the housing 61 is prevented from rotating with respect to the connecting rod 21 by the slide member 9 and the block 50.

As shown in FIG. 1, the inverted cup-shaped housing 61 is inserted into the skirt portion 2c of the piston 2 with the bottom wall placed in contact with the lower surface 2b of the crown portion 2a. The flange 22b at the lower end of the arresting sleeve 22 is supported on the retaining tube 26 which is secure to the skirt portion 2c as shown in FIG. 2. Formed on the skirt portion 2c, at peripherally equal intervals, are a plurality of diametrically inwardly projecting wide protrusions 27. On the other hand, the retaining ring 26 is formed in its outer peripheral surface with axial grooves 26b which are greater in length than the protrusions 27. A pin 37 has its base end threadedly supported on the peripheral wall of the retaining ring 26 and its extreme end inserted into a pin hole 38 in the skirt portion 2c.

During assembly, the rod end 16, slide member 9, collar 23, sleeve 22, pads 20 and screws 63 are first fitted into the housing 61 as described above and then inserted as a unit into the cavity formed by the skirt 2c. The retaining ring 26 then is fitted into the skirt portion 2c by diametrically inwardly retreating the pin 37 and bringing the grooves 26b into engagement with the protrusions 27 to force the former therein. Next, the retaining ring 26 is rotated to position the portions of the ring 26 between the grooves 26b above the protrusions 27. When the extreme end of the pin 37 is engaged with the pin hole 38, the retaining ring 26 cannot be moved in either peripheral or axial directions.

The cooling oil chamber 5 surrounding the crown portion 2a of the piston 2 is defined in the bottom wall of the housing 61. Oil jetted out of an oil jet (not shown) enters the annular cooling oil chamber 5 via an inlet oil passage 33 in the annular collar 23 and an oil passage 33a in the housing 61 to cool the crown portion 2a. The oil then returns to a crank chamber via an oil passage 34a in the housing 61 and an outlet oil passage 34 in the annular collar 23. Simultaneously, oil supplied from an oil pump (not shown) connected to an internal oil passage 19 in the connecting rod 21 flows to the oil chamber 65 to lubricate the engaged surfaces of the receiving rod and 16 and the slide member 9. Oil in the oil chamber 65 also lubricates engaged surfaces on the upper end surface of the annular collar 23 and the bottom wall of the housing 61 and the engaged surfaces of the arresting ring 22 and the pads 20, respectively.

Oil in the internal oil passage 19 also flows through an oil passage 41 in the slide member 9 and an oil passage 50a (FIG. 4) of the key block 50 to lubricate the engaged surfaces of the slide member 9 and the bottom wall of the housing 61, the engaged surfaces of the bottom wall of the housing 61 and the crown portion 2a and the engaged surfaces of the block 50 and the grooves 51, 53 and the square hole 52, respectively. In addition, oil in the oil passage 50a lubricates the engaged concave surface 23a of the annular collar 23 and the convex surface 16b of the receiving rod end 16 via oil passages 44, 46 in the bottom wall of the housing 61 and oil passages 47, 48 in the annular collar 23, before returning to a crank chamber (not shown).

Figure 5:
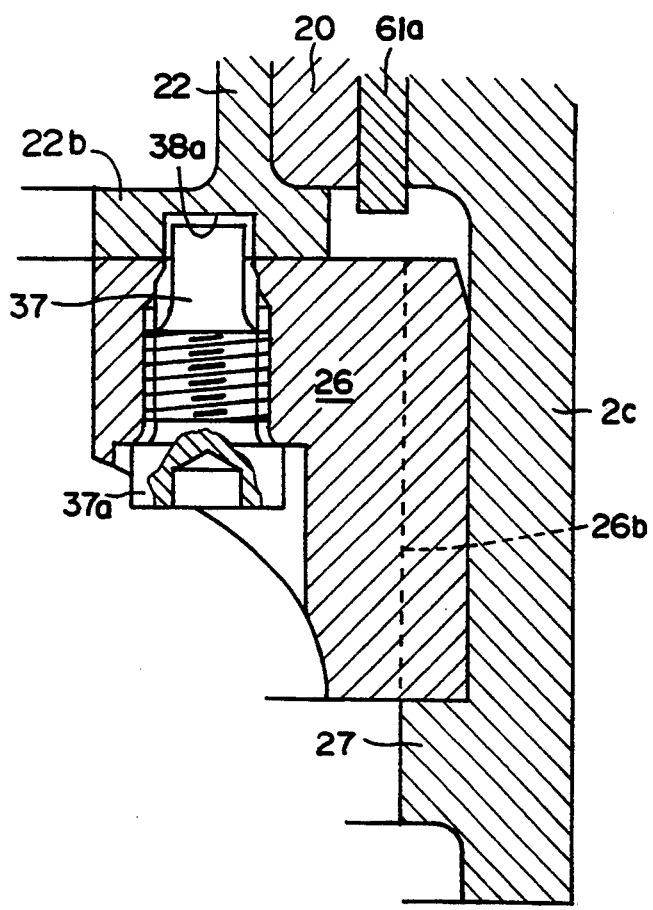
FIG. 5 is a front sectional view showing a piston and a connecting rod assembly according to a modified embodiment of the invention.

In an embodiment shown in FIG. 5, a pin 37a threadedly supported on the retaining ring 26 is inserted into a pin hole 38a provided in the flange 22b at the lower end of the arresting sleeve 22. Rotation of the retaining ring 26 with respect to the sleeve 22 is thereby prevented.

Figure 6:
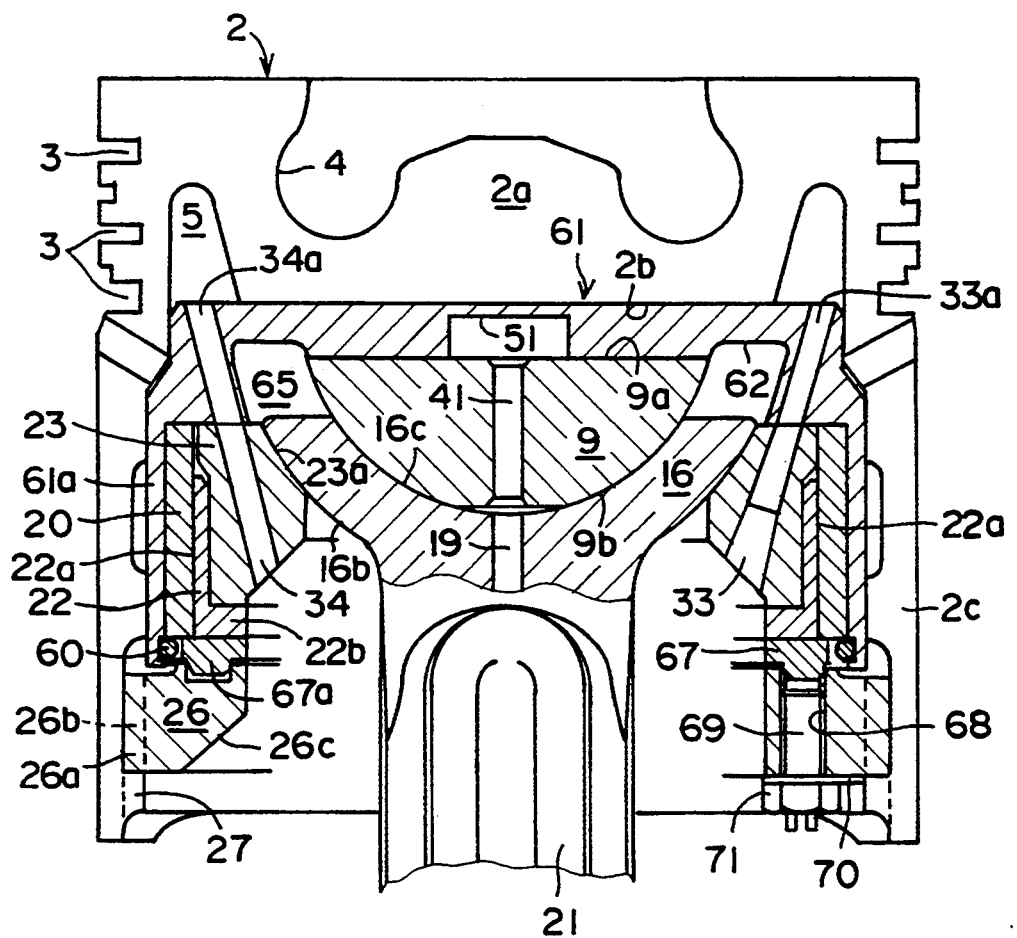
FIG. 6 is a front sectional view of a piston and connecting rod assembly according to another modified embodiment of the invention.

In the embodiments shown in FIGS. 6 and 7, provision again is made to prevent relative rotation of the annular collar 23 with respect to the housing 61 while permitting slight relative translational movement therebetween in a direction of a crank shaft (not shown). The arresting sleeve 22 and the pads 20 are retained by a stop ring 60 engaged with an annular groove in the inner surface of the lower end of the peripheral wall 61a of the housing 61. The arresting sleeve 22 is connected to the peripheral wall 61a of the housing 61 by a pin 30 parallel with the crank shaft in place of the pin 63 shown in FIG. 1.

To provide for adjustment of the receiving rod end 16, an annular rib 67a is formed on the lower surface of an annular adjusting plate 67. The rib 67a is inserted into an annular groove formed in the upper surface of the retaining ring 26. A flange 22b at the lower end of the arresting sleeve 22 is supported on the adjusting plate 67 which is forced upwardly by a plurality of bolts 69 threadedly engaged with threaded holes 68 in the retaining ring 26. When a proper clearance is obtained for the sliding portion of the receiving rod end 16, the bolts 69 are fixed by lock nuts 71.

Figure 7:
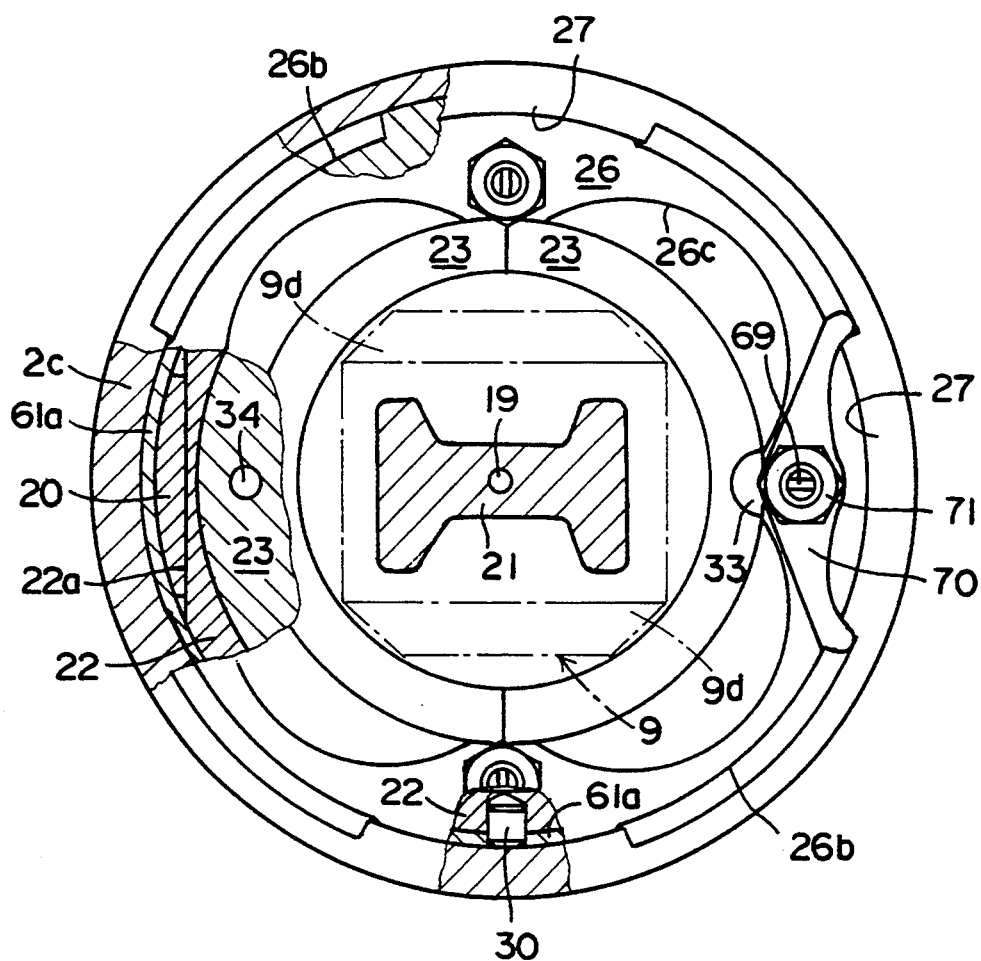
FIG. 7 is a bottom view of the piston and a connecting rod assembly shown in FIG. 6.

To reduce the weight of the retaining ring 26, an inner peripheral wall thereof is provided with four partial conical cuts 26c at peripherally equal intervals (FIG. 7). A C-shaped stop plate 70 in contact with the lower surface of the retaining ring 26 is fitted over each bolt 69 and fastened by a lock nut 71. The stop plate 70 is used in place of the pin 37 shown in FIG. 1. Supporting the intermediate portion of the stop plate 70 are the bolts 69, the opposite ends thereof engage the peripheral ends of the protrusions 27 on the skirt portion 2c. Thus, rotation of the retaining ring 26 with respect to the piston 2 is prevented.

Obviously, many modifications and variations of the present invention are possible in light of the above teachings. It is to be understood, therefore, that the invention can be practiced otherwise than as specifically described.

What is claimed is:

1. Internal combustion engine apparatus comprising:
 piston means having a crown surface, a bottom surface, and a skirt projecting therefrom and defining therewith a cavity;

cup-shaped housing means retained in said cavity and having a bottom wall engaging said bottom surface and a side wall engaging said skirt;

collar means retained within said housing means and defining an annular concave surface facing said bottom surface;

a connecting rod having a transversely projecting end portion defining an annular convex surface engaging said concave surface and an axially outwardly facing recess defining a slide surface; and a slide member retained in said recess and slidably engaged between said slide surface and said bottom wall.

2. An apparatus according to claim 1 including keying means for preventing relative rotational movement between said end portion of said connecting rod and said piston means along a longitudinal axis thereof, and permitting relative translational movement between said piston means and said end portion of said connecting rod in a direction transverse to said longitudinal axis.

3. An apparatus according to claim 2 wherein said slide member is semi-cylindrical and non-rotatably retained in said recess and said keying means comprises a key member projecting through said bottom wall and having opposite ends received by slots formed in, respectively, said slide member and said bottom surface.

4. An apparatus according to claim 3 wherein said collar means comprises an annular collar defining said concave surface, an annular cylindrical sleeve engaging an outer surface of said collar and having outwardly directed diametrically opposed flat surfaces, a crescent shaped member engaged between each of said flat surfaces and said side wall, pin means keying said crescent shaped members to said side wall, and a ring member fixed between said skirt and said cylindrical sleeve.

5. An apparatus according to claim 4 wherein said collar is formed by circumferentially divided parts.

6. An apparatus according to claim 4 wherein said collar means further comprises an annular adjustment plate disposed between said sleeve and said ring member, and a plurality of bolts adjustably engaged therebetween.

7. An apparatus according to claim 3 wherein said piston means has an annular cooling chamber defined by said bottom wall and an annular groove in said bottom surface; said bottom wall has an annular groove communicating directly with said engaged concave and convex surfaces, said engaged surfaces of said slide member and said bottom wall, and said engaged surfaces of said slide member; and each of said collar means and said bottom wall defines inlet and outlet passages communicating with said cooling chamber.

8. An apparatus according to claim 7 wherein said connecting rod, said slide member, said key member, and said bottom wall together define at least one lubrication passage extending between a source of lubricant and an interface between said concave surface and said convex surface.

9. An apparatus according to claim 8 wherein said collar means comprises an annular collar defining said concave surface, an annular cylindrical sleeve engaging an outer surface of said collar and having outwardly directed diametrically opposed flat surfaces, a crescent shaped member engaged between each of said flat surfaces and said side wall, pin means keying said crescent shaped members to said side wall, and a ring member fixed between said skirt and said cylindrical sleeve.

10. An apparatus according to claim 9 wherein said collar is formed by circumferentially divided parts.

11. Internal combustion engine apparatus comprising:

piston means defining an annular cooling chamber and having a crown surface, a bottom surface, and a skirt projecting therefrom and defining therewith a cavity;

collar means retained within said cavity and defining an annular concave surface facing said bottom surface;

a connecting rod having a transversely projecting end portion defining an annular convex surface engaging said concave surface and an outwardly facing recess defining a slide surface;

a slide member retained in said recess and slidably engaged with said slide surface;

cooling means defining inlet and outlet cooling passages each communicating with said cooling chamber; and lubrication means defining at least one lubricating passage providing communication between a source of lubricant and an interface between said convex surface and said concave surface.

12. Internal combustion engine apparatus comprising:

piston means having a crown surface, a bottom surface, and a skirt projecting therefrom and defining therewith a cavity;

collar means retained within said cavity and defining an annular concave surface facing said bottom surface;

a connecting rod having a transversely projecting end portion defining an annular convex surface engaging said concave surface and an outwardly facing recess defining a slide surface;

a slide member retained in said recess and slidably engaged with said slide surface; and keying means shaped and arranged to prevent relative rotational movement between said connecting rod and said piston means, and to allow relative translational movement therebetween.

13. An apparatus according to claim 12 wherein said piston means has an annular cooling chamber defined by an annular groove in said bottom surface and said bottom wall, and said collar means defines inlet and outlet passages communicating with said cooling chamber.

14. An apparatus according to claim 13 wherein said connecting rod, said slide member, said key member, and said bottom wall together define at least one lubrication passage extending between a source of lubricant and an interface between said concave surface and said convex surface.

15. A method of assembling for an internal combustion engine a piston and a connecting rod, the piston having a crown surface, a bottom surface, and a skirt projecting therefrom and defining therewith a cavity and the connecting rod having a transversely projecting end portion defining an annular convex surface and an oppositely facing recess, said method including the steps of:

forming a cup-shaped housing means having a bottom wall and a side wall;

forming a slide member conforming substantially to said recess;

forming collar means defining an annular concave surface conforming to said convex surface;

positioning said slide member in said recess;

inserting said end portion into said cup-shaped housing means with said slide member engaging said bottom wall;

securing said collar means in said cup-shaped housing with said convex surfaces engaging said concave surface;

keying said end portion to said cup-shaped housing so as to prevent relative rotational movement therebetween;

inserting said end portion, said slide member, said collar means and said cup-shaped housing as a unit into said cavity so as to produce engagement between said bottom wall and said bottom surface; and securing said housing to said piston.

16. A method according to claim 15 wherein said keying step establishes a keyed relationship that permits relative translational movement between said end portion and said cup-shaped housing.

17. A method according to claim 16 wherein said securing step comprises the step of keying said cup-shaped housing to said piston so as to prevent relative rotational movement therebetween while permitting relative translational movement therebetween.

* * * * *